(12) United States Patent
Petrovic et al.

(10) Patent No.: US 8,220,615 B2
(45) Date of Patent: Jul. 17, 2012

(54) METHOD AND EQUIPMENT FOR ALIGNING CONVEYED PRODUCTS ON A TABLE

(75) Inventors: Zmaj Petrovic, Octeville sur Mer (FR); Denis Krauth, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 128 days.

(21) Appl. No.: 12/669,755

(22) PCT Filed: Jul. 1, 2008

(86) PCT No.: PCT/FR2008/051221
§ 371 (c)(1),
(2), (4) Date: Jan. 19, 2010

(87) PCT Pub. No.: WO2009/019357
PCT Pub. Date: Feb. 12, 2009

(65) Prior Publication Data
US 2010/0193330 A1    Aug. 5, 2010

(30) Foreign Application Priority Data

Jul. 20, 2007   (FR) ...................................... 07 05245

(51) Int. Cl.
*B65G 47/31*    (2006.01)
*B65G 15/12*    (2006.01)
(52) U.S. Cl. ..................... 198/452; 198/461.1; 198/605; 198/817
(58) Field of Classification Search .......... 198/452–455, 198/457.05, 461.1–461.3, 817
See application file for complete search history.

(56) References Cited

U.S. PATENT DOCUMENTS 4,054,199 A  *  10/1977  Polderman .................... 198/452
6,168,005 B1 *   1/2001  Petrovic ..................... 198/347.4
(Continued)

FOREIGN PATENT DOCUMENTS

DE          31 29 389 A1     2/1983
(Continued)

OTHER PUBLICATIONS

Chinese Office Action issued in corresponding Chinese Application No. 200880108166.8, dated Mar. 5, 2012.

*Primary Examiner* — Mark A Deuble
(74) *Attorney, Agent, or Firm* — Sughrue Mion, PLLC

(57) ABSTRACT

The method of the invention comprises guiding the bottles (1) in an angled direction on the alignment table (13) between the inlet and the outlet thereof and simultaneously gradually accelerating the speed of said bottles (1) on a portion of said table (13) from said inlet in order to reach a speed higher that the nominal speed Vn. The method further comprises submitting the bottles (1) to at least two alternating closing-up and spacing operations in the downstream portion of the alignment table (13) before the discharge thereof in the form of a queue made by a transfer conveyor (14). The equipment for implementing the method particularly comprises: a group of bands including at least two pairs of bands (15.1, 15.2, and 15.3, 15.4 . . . ) operated within each pair at different speeds in order to carry out in an alternating manner from one pair to the other closing-up and spacing operations of the bottles (1) running on said bands (15as).

15 Claims, 1 Drawing Sheet

U.S. PATENT DOCUMENTS

| | | | |
|---|---|---|---|
| 6,206,174 B1 * | 3/2001 | Koltz | 198/444 |
| 6,328,151 B1 * | 12/2001 | Spangenberg et al. | 198/347.4 |
| 6,575,287 B2 * | 6/2003 | Garvey et al. | 198/418.6 |
| 7,198,147 B2 * | 4/2007 | Petrovic | 198/452 |
| 7,222,718 B2 * | 5/2007 | Tarlton | 198/445 |
| 7,252,186 B2 * | 8/2007 | Paquin et al. | 198/347.4 |
| 7,441,645 B2 * | 10/2008 | Paquin et al. | 198/347.1 |
| 7,942,255 B2 * | 5/2011 | Seger et al. | 198/452 |

FOREIGN PATENT DOCUMENTS

| | | |
|---|---|---|
| DE | 43 32 341 A1 | 3/1995 |
| EP | 1 380 522 A1 | 1/2004 |
| EP | 1 497 208 B1 | 9/2006 |
| FR | 2330618 A1 | 9/1975 |

* cited by examiner

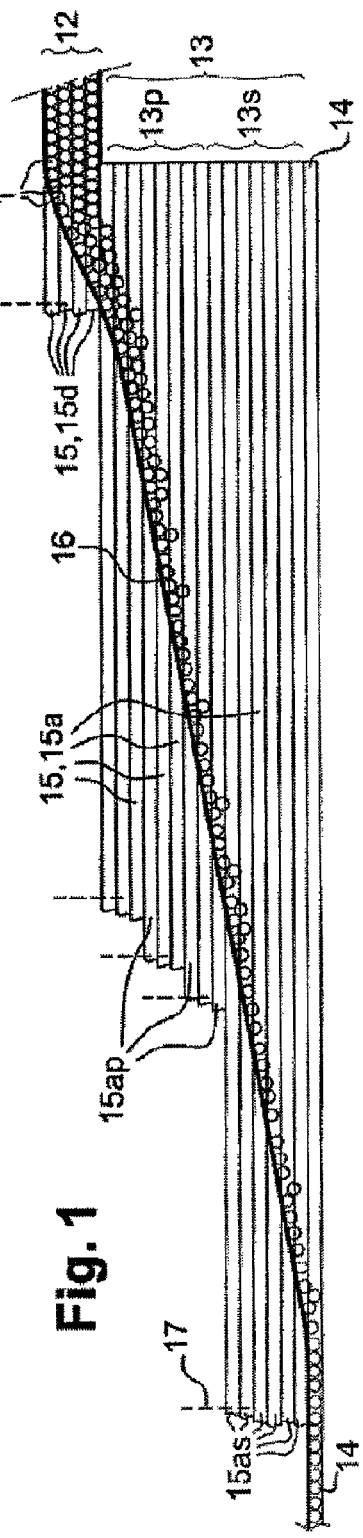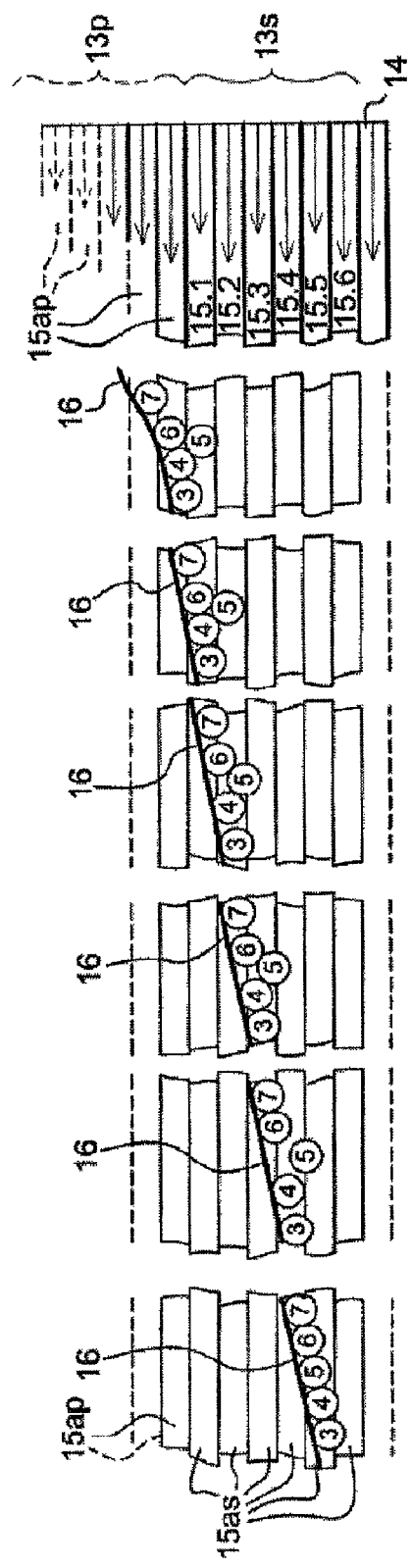

METHOD AND EQUIPMENT FOR ALIGNING CONVEYED PRODUCTS ON A TABLE

The present invention relates to a method for aligning, one behind the other, a flow of bottle-type products leaving a dosing table, after an accumulator, for example, or other device. It also relates to the installation arranged in order to implement this method.

Document FR 2330618 describes an installation that makes it possible to transform a flow of bottles into a single queue where said bottles are conveyed one behind the other to a filling or other unit.

This installation comprises a dosing table that prepares a flow of bottles coming from an accumulating table, for example. This table is formed by juxtaposed endless bands for conveying the flow of bottles by moving them forwards at a speed, called the nominal speed Vn, which makes it possible to reach a flow rate corresponding more or less to the flow rate of the production unit that discharges the bottles on the accumulating table.

The bottles pass from the dosing table to an alignment table that is also formed by several juxtaposed endless bands and by a guide, which guide is arranged in an angled direction above said alignment table, causing the bottles to move from one band to the other as they progress towards the downstream end of the table and in particular towards the discharge conveyor.

The different endless bands of the alignment table are operated at a speed that increases gradually from the inlet of said table. These speeds increase progressively to stretch out the flow of bottles and allow for them to be aligned, in single file, as they progress along this alignment table.

With the increase in speed on the multi-band table, the space between the bottles increases and the resultant force generated by the guide causes the bottles to be inserted in between each other.

A similar provision is found in document EP 1497208 with a particular arrangement at the dosing, or transition, table, which extends between the accumulating table and the alignment table.

The output rates, which are increasingly rapid, no longer make it possible to guarantee an alignment of the bottles over reasonable distances.

Despite the arrangements made to these installations, the alignment of the products remains a problem and incidents are still encountered with products that are not successfully integrated into the queue even when the time spent on the alignment table is increased and the table is extended.

In the abovementioned FR document, this problem is solved by the addition, at the margin of the discharge conveyor, of a reintegration conveyor that brings back the bottles not inserted in the upstream part of the alignment table.

This solution increases the handling of the bottles with the risks of alterations and damages to the bottles, caused by friction against the guides.

The invention makes it possible to treat this alignment problem in an effective and more logical manner, without complicating the installation.

In addition it makes it possible to simplify the adjustments when it is necessary to adapt the speed of the bottles on the tables as a function of the output rates and as a function of the type of bottles, certain bottles being more stable than others.

These characteristics and parameters of the products to be aligned can be more easily taken into account by the operator in order to optimize the alignment process and achieve maximum yield without risks for the products and in particular without risks of falls.

The installation for the implementation of the method retains a certain compactness; it can even have more advantageous dimensions than the installations described in the abovementioned documents.

According to the invention, the method consists of aligning, one behind the other, bottles arriving in a flow, via a dosing table, on an alignment table of the multi-band type, said method consisting of:
    guiding said bottles in an angled direction on said alignment table between its inlet and its outlet and, simultaneously,
    gradually accelerating the speed of said bottles over part of said alignment table, from said inlet and, furthermore,
    subjecting said bottles to at least two alternating closing-up and spacing operations, on the downstream part of said alignment table, before their discharge, in the form of a queue formed, by a transfer conveyor, which operations increase the bottles' chances of integration by giving the bottles that are located in the second line the possibility of being positioned in a gap, even if this gap is not large enough to immediately join the queue, and being held in this gap by a wedge effect to overcome the following closing-up operation before easily joining said queue in the following spacing operation.

Still according to the invention, the method consists of carrying out the closing-up operation at a speed that is situated within a range from Vn to 1.1 Vn.

According to another provision of the invention, the method consists of carrying out the spacing operation at a speed that is situated within a range from 1.2 Vn to 1.3 Vn.

The invention also relates to the installation arranged in order to implement the method described in detail above.

This installation according to the invention comprises in particular:—a dosing table that delivers a flow of bottles at an appropriate speed,—a transfer conveyor that discharges the queue of bottles, when it is formed, at a speed that is higher than the nominal speed Vn and, between the two,—a multi-band alignment table that is surmounted by a guide arranged in an angled direction between its two ends, which alignment table comprises two groups of bands:
    a first group of bands that receives and aligns, so far as possible, the bottles coming from said dosing table, which first group of bands is operated at increasing speeds starting from a speed substantially higher than the speed of delivery of the bottles by said dosing table, to gradually reach a speed higher than the nominal speed Vn and,
    a second group of bands, before said transfer conveyor, formed by at least two pairs of bands that are operated at different speeds within each pair, in order to carry out, in alternating manner and from one pair to the other, the operations of closing-up and spacing the bottles running on said bands.

Still according to the invention, in each pair of bands, the upstream band which is involved in the closing-up operation of the bottles, operates at a speed that is situated within a range from Vn to 1.1 Vn and the downstream band which is involved in the spacing operation of the bottles, operates at a speed that is situated within a range from 1.2 Vn to 1.3 Vn.

In a conventional manner, the bands of the different pairs are driven at one of their ends by the same drive shaft, which comprises gear wheels of different diameters.

The invention will also be described in more detail by means of the following description and attached drawings, given by way of indication, in which:

FIG. 1 is a diagrammatic plan view of an installation comprising in particular an alignment table according to the invention, FIG. 2 shows the upstream part of the pairs of bands that are arranged before the transfer conveyor, in the downstream part of the alignment table, with an indication of the speed of the different bands, FIGS. 3 to 8 illustrate, diagrammatically, the process of aligning the bottles not yet integrated, at the downstream part of the alignment table.

The installation shown in FIG. 1 is fitted, for example, into an overall installation for the preparation of bottle-type products (1), between a filling machine and a labelling machine, not shown.

This installation is of the type described in the abovementioned documents and in particular document EP 1497208.

It comprises a dosing table (12) that feeds the alignment table (13), which alignment table (13) arranges the products (1) in single file, without pressure between them, so that they can be transferred, by an appropriate conveyor (14) to their subsequent destination: a labelling unit, for example.

These different tables are formed by modular motorized endless bands (15), which form a continuous flat surface on which the products can slide.

The speeds of these endless bands (15) differ from one place to another. As indicated in the abovementioned document FR 2330618, the speed of the bands is very low at the accumulating table, i.e. upstream of the dosing table (12).

The speed is higher for the group of bands of the dosing table (12), which is marked (15d) in FIG. 1. This speed is to a certain extent a function of the output rate of the upstream and downstream production units and is established as a function of a so-called nominal speed Vn, which nominal speed corresponds to C (output rate) multiplied by D (diameter of the bottles).

The transfer conveyor (14) is operated at a speed that is generally of the order of 1.2 Vn.

Between the dosing table (12) and the transfer conveyor (14), the speed increases and this is what makes it possible to form spaces between the bottles (1) and align them one behind the other.

In order to form this alignment, a guide (16) is arranged above the alignment table (13), in an angled direction between the two ends of said table.

The inclination of this guide (16) has an influence on the length of the installation. It also has an influence on the effectiveness of the alignment of the bottles in combination with other parameters such as the width of the bands, their speed and parameters associated directly with the bottles, such as their diameter and their stability.

The alignment table (13) is made up of two parts: a primary table (13p) which is situated following the dosing table (12) for receiving the flow of bottles (1) delivered by said table (12) and a secondary table (13s) which is placed between this primary table (13p) and the transfer conveyor (14).

On the alignment table (13p), the speed of the bands (15a) gradually increases to reach a speed that is of the order of 1.2 times the nominal speed Vn.

The bottles are aligned on the guide (16) thanks to the progressive increase in the speed of the different bands (15ap) that make up the primary table (13p). The gradual increase in the speed of the bands (15ap), starting from the outlet of the dosing table (12), generates spaces between the bottles (1) that are driven by these bands (15ap).

The guide (16) channels the bottles (1) and, above all, it generates a resultant force that is sufficient to help those having difficulty in finding a place in the queue, by forcing the bottles on either side to move apart.

Despite these arrangements, it happens that products get stuck in double file and do not manage to take their place in the queue which, furthermore, can cause incidents at the transfer conveyor (14).

The secondary alignment table (13s) comprises bands (15as) that make it possible to complete the process of alignment of the bottles (1).

This table (13s) is made up of several pairs of bands (15as), at least two pairs, and preferably three pairs in order to achieve complete effectiveness.

The bands (15as) of these three pairs are marked, in FIG. 2, (15.1) to (15.6).

The first band (15.1), which is situated after the last band (15ap) of the primary table (13p), is operated at a speed that is lower than that of said band (15ap).

The second band (15.2) moves at a higher speed than the first band (15.1) and so on with alternating reduced speed and higher speed.

The speeds are chosen taking account of the nominal speed Vn and of the characteristics and parameters of the bottles (1) to be conveyed.

The speed of the first band (15.1) can be of the order of the nominal speed Vn whereas the speed of the previous band (15ap) is 1.2 Vn as indicated previously. The speed of the second band (15.2) is of the order of 1.2 Vn and so on. The odd bands (15.1, 15.3, 15.5) have a speed that is lower than that of the even bands (15.2, 15.4, 15.6).

However, as a function of the different parameters mentioned previously and in particular the stability of the bottles (1), the speed of the third band (15.3) can be slightly higher, 1.1 Vn, for example, and that of the fourth band (15.4), of the order of 1.3 Vn. This slightly higher speed can also apply to the subsequent bands.

The bands (15.1 to 15.6) are driven at one of their ends by the same drive shaft (17) which, in a conventional manner, comprises wheels, not visible, of different diameters.

FIGS. 3 to 8 show how a train of bottles forms between the start and the end of the secondary alignment table (13s).

The train of bottles (3) to (7) shown in FIG. 3, comprises one non-integrated bottle (5) that is situated, at the start of the table (13s), in the second line.

The passage of the train of bottles onto the band (15.1), FIG. 4, has the effect of closing up the train of bottles (3) to (7) while causing them to progress against the guide (16), which guide generates a resultant force that promotes integration.

Then, the passage of the train of bottles onto the band (15.2), the speed of which is higher than that of the band (15.1), causes a splitting of the queue, FIG. 5; the bottles move apart from each other and the bottle (5) is inserted into the space that forms between the bottles (4) and (6).

As shown by FIGS. 5 and 6, the space between the bottles (4) and (6) is not large enough to allow complete integration of the bottle (5) between the two; however, this integration is sufficient to allow said bottle (5) to be held by wedge effect between said bottles (4) and (6) and they progress together on the band (15.3);

This band (15.3), the speed of which is lower than that of the previous band (15.2), generates a new phase of closing-up of the train of bottles (3 to 7), but this closing-up is ineffective on the group of bottles (4 to 6) as these three bottles are already in contact and it is the bottle (5) that is keeping the space between the other two by means of the abovementioned wedge effect.

Having a train of bottles with a limited number of bottles, of the order of 5 to 12 depending on the diameter, makes it possible to reduce the pressures of the bottles on each other inside said train; this feature makes the wedge effect more effective. The smaller the diameter of the bottles, the more effective the wedge effect.

The band (15.4) then causes a new phase of stretching out of the queue and spacing of the bottles in the train in relation to each other and in particular of the bottles (4) and (6), as shown in FIG. 7; this time, the bottle (5) can be inserted between the bottles (4) and (6) as the train of bottles progresses, as shown in FIG. 8.

It is this sequence of closing-up and spacing operations of the bottles that allows for their alignment to be successfully completed before they reach the transfer conveyor (14). If the bottle (5) which was in double file at the start had not found its place on band (15.4), it could still find it afterwards, on band (15.6).

The alignment method and installation are suitable for all types of products that are equivalent to bottles made of glass or of a thermoplastic material such as, for example, glass jars or metal cans, and products of various shapes: oval or virtually round.

The invention claimed is:

1. A method for aligning, one behind the other, bottle-type products arriving in a flow, via a dosing table, on a multi-band alignment table, said method comprising:
   guiding said bottle-type products in an angled direction on said multi-band alignment table continuously between an inlet and an outlet of said multi-band alignment table and simultaneously,
   gradually accelerating a speed of said bottle-type products over a part of said multi-band alignment table, from said inlet, to reach a speed higher than a nominal speed Vn, and
   subjecting said bottle-type products to at least two alternating closing-up and spacing operations, on a downstream part of said multi-band alignment table, before discharge of said bottle-type products, in the form of a queue formed, by a transfer conveyor.

2. The method for aligning products according to claim 1, wherein said closing-up operation is carried out at a speed which is situated within a range from Vn to 1.1 Vn.

3. The method for aligning products, according to claim 1, wherein said spacing operation is carried out at a speed that is situated within a range from 1.2 Vn to 1.3 Vn.

4. The method for aligning products according to claim 1, wherein said closing-up operation comprises passing said-bottle type products from a first band of said multi-band alignment table to a second band of said-multiband alignment table operated at a speed slower than a speed of said first band.

5. The method for aligning products according to claim 1, wherein said spacing operation comprises passing said-bottle type products from a first band of said multi-band alignment table to a second band of said-multiband alignment table operated at a speed faster than a speed of said first band.

6. A multi-band alignment table comprising:
   a guide extending from an inlet of the multi-band alignment table to an outlet of the multi-band alignment table;
   a primary table comprising primary bands that receive bottle-type products and accelerate a speed of the bottle-type products along a portion of the guide from a speed at which the multi-band products arrive to a speed greater than a nominal speed; and
   a secondary table comprising secondary bands that receive the bottle-type products from the primary bands of the primary table and discharge the bottle-type products along the guide as a single file queue of the bottle-type products, the secondary bands decelerating the speed of the bottle-type products along a portion of the guide from the speed greater than the nominal speed to a first speed, accelerating the speed of the bottle-type products along a portion of the guide from the first speed to a second speed, decelerating the speed of the bottle-type products along a portion of the guide from the second speed to a third speed, and accelerating the bottle type products along a portion of the guide from the third speed to a fourth speed.

7. The multi-band alignment table according to claim 6, wherein the first speed is approximately the nominal speed.

8. The multi-band alignment table according to claim 6, wherein the nominal speed is a speed at which a flow rate of the bottle-type products received by the primary table is approximately a flow rate of the bottle-type products discharged by the secondary table.

9. The multi-band alignment table according to claim 6, wherein the secondary bands comprise a first band operating at the first speed, a second band operating at the second speed, a third band operating at the third speed, and a fourth band operating at the fourth speed.

10. The multi-band alignment table according to claim 6, wherein the second speed is approximately twenty percent greater than the nominal speed, the third speed is approximately ten percent greater than the nominal speed, and the fourth speed is approximately thirty percent greater than the nominal speed.

11. The multi-band alignment table according to claim 6, wherein the third speed is greater than the first speed and the fourth speed is greater than the second speed.

12. The multi-band alignment table according to claim 6, wherein the first speed is equal to the third speed and the second speed is equal to the fourth speed.

13. An installation for aligning, one behind the other, bottle-type products arriving in flow, said installation comprising:
   a dosing table that conveys a flow of said bottle-type products at an appropriate speed;
   a transfer conveyor that discharges a queue of said bottle-type products, when it said queue is formed, at a speed that is higher than a nominal speed Vn; and
   between said dosing table and said transfer conveyor, a multi-band alignment table that is surmounted by a guide arranged in an angled direction, said guide extending continuously between two ends of said multi-band alignment table between said dosing table and said transfer conveyor, said alignment table comprising two groups of bands:
      a first group of bands that receives and aligns, so far as possible, said bottle-type products coming from said dosing table, which first group of bands is operated at increasing speeds starting from a speed substantially higher than a speed of delivery of said bottle-type products, by said dosing table, to gradually reach a speed higher than the nominal speed Vn; and
      a second group of bands, arranged before said transfer conveyor, formed by at least two pairs of bands that are operated at different speeds within each pair, in order to carry out, in alternating manner and from one pair to the other, operations of closing-up and spacing the bottle-type products running on said bands.

14. The installation according to claim 13, wherein a speed of odd bands involved in said closing-up operation of the products is situated within a range from Vn to 1.1 Vn.

15. The installation according to claim 13, wherein a speed of even bands involved in said spacing operation of the products is situated within a range from 1.2 Vn to 1.3 Vn.

* * * * *